US006327707B1

(12) United States Patent
McKeeth et al.

(10) Patent No.: US 6,327,707 B1
(45) Date of Patent: Dec. 4, 2001

(54) METHOD, PROGRAMMED MEDIUM AND SYSTEM FOR CUSTOMIZING PRE-LOADED SOFTWARE

(75) Inventors: James McKeeth; John Egan, both of Nampa; Eric Heupel, Boise, all of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/323,040

(22) Filed: Jun. 1, 1999

(51) Int. Cl.[7] ..................................................... G06F 9/45
(52) U.S. Cl. ................................... 717/11; 717/4; 717/1; 705/59; 709/223; 709/228
(58) Field of Search ..................... 717/11, 1, 4; 709/223, 709/228, 249; 705/59

(56) References Cited

U.S. PATENT DOCUMENTS

| | | | |
|---|---|---|---|
| 5,490,216 | * | 2/1996 | Richardson ............................ 705/59 |
| 5,748,896 | * | 5/1998 | Daly et al. ............................ 709/223 |
| 5,790,785 | * | 8/1998 | Klug et al. ............................ 713/202 |
| 5,815,665 | * | 9/1998 | Teper et al. ........................... 709/229 |
| 5,862,322 | * | 1/1999 | Anglin et al. ....................... 395/185.1 |
| 5,867,667 | * | 2/1999 | Butman et al. ....................... 709/249 |
| 5,920,719 | * | 7/1999 | Sutton et al. ............................. 717/4 |
| 5,935,251 | * | 8/1999 | Moore ................................... 713/202 |
| 5,950,000 | * | 9/1999 | O'Leary et al. .......................... 717/1 |
| 5,970,252 | * | 10/1999 | Buxton et al. .......................... 717/11 |
| 5,978,579 | * | 11/1999 | Buxton et al. ........................... 717/1 |
| 6,023,698 | * | 2/2000 | Lavey, Jr. et al. ...................... 707/10 |
| 6,044,471 | * | 3/2000 | Colvin .................................. 713/202 |
| 6,128,663 | * | 10/2000 | Thomas ................................ 709/228 |
| 6,151,707 | * | 11/2000 | Hecksel et al. ......................... 717/11 |
| 6,167,567 | * | 12/2000 | Chiles et al. ........................... 717/11 |
| 6,202,022 | * | 3/2000 | Ando .................................... 701/200 |

OTHER PUBLICATIONS

Title: WebEntree: A web service aggregator, author: Y Zhao, IBM Systems Journal, 1998.*
Title: Amplitude Unveils Complete Event Registration Solution, Web–Based EventCenter Registration Module Provides Fully Integrated Event, Source: Business Wire, 1998.*
Title: Engaging User Profiles on Web Announce a suite of software & services for Web site advertiser, source: PC week, 1997.*
Title: Revolutionary online software registration product, CyberReg, offers higher return rates and increased revenues, source PE Newswire, 1997.*

* cited by examiner

Primary Examiner—Mark R. Powell
Assistant Examiner—Chameli C. Das
(74) Attorney, Agent, or Firm—Perkins Coie LLP

(57) ABSTRACT

The present invention provides a method, programmed medium and system for customizing pre-loaded software. A user is prompted to supply user-specific registration information which automatically replaces pre-existing registration information that was provided by a computer manufacturer upon loading of the pre-loaded software.

33 Claims, 4 Drawing Sheets

METHOD, PROGRAMMED MEDIUM AND SYSTEM FOR CUSTOMIZING PRE-LOADED SOFTWARE

BACKGROUND OF THE INVENTION

1. Field of the Invention

The present invention relates to customizing software. In particular, the invention relates to customizing software that is pre-loaded by the computer manufacturer by replacing generic information with information specific to the end user.

2. Description of the Related Art

Computers use an operating system, such as Windows 98®, that provides an environment in which applications, such as word processors, databases, and spreadsheets, can operate. In the case of software written to operate in the Windows 98® environment, each application stores user information in common areas, known as registry files. For example, the user information can be stored in system data and user data files in Windows 98®. When an application is selected by a user, the information stored in these files is displayed.

When software is first installed on a computer, the software will prompt a user to enter a user or company name and other information. When such software is pre-loaded on a computer by the manufacturer, generic information is often provided in response to such prompts. There is currently no easy method for the PC owner, who ultimately acquires the computer, to customize this previously installed information. Often, reinstallation of the software is required to change the pre-stored information, which is both tedious and time-consuming.

For many customers, especially businesses, this presents a problem. They like or need the professional appearance of their name and company information used and displayed within the software. At the same time, many do not have the time to manually reload all of their software to achieve this goal.

As an alternative to reinstalling the software on their PCs, users could manually correct entries in the registry of the operating software. However, this approach is not optimal because it, too, is a tedious process and it requires specialized knowledge by the user on how to find and then manually change registry entries. In addition, it is possible to edit the wrong entries in the registry, which could result in reduced functionality of the system.

The present invention overcomes the above-recited problems by providing a method for customizing pre-loaded software by automatically replacing pre-existing registration information with user-supplied registration information.

SUMMARY OF THE INVENTION

The present invention provides a program that allows a user to replace the pre-loaded stored registration information with customized information. In other words, a user is able to easily change one or more operating system registry files. The invention prompts a user for new user registration information, searches the registry files for pre-existing registration information, and replaces the pre-existing registration information with the new user registration information.

The invention also saves the pre-existing registration information to a registry backup file. The invention prompts the user for a storage location for the backup file, stores the registration information at a location provided by the user and provides the user with instructions for restoring the backup file. If the user does not provide a storage location, the invention informs the user that the backup file has not been saved.

DETAILED DESCRIPTION OF THE DRAWINGS

The present invention provides an end user registration wizard, which is a program run on a computer containing a central processing unit (CPU) for customizing the registration information of software that has been pre-loaded on the computer by the computer manufacturer. In particular, the invention looks for pre-existing information, such as "Preferred Customer" and "Company Name" and replaces the pre-existing information with customer-supplied information. The invention also includes a computer readable storage medium containing computer readable code for the registration wizard and a system for implementing the registration wizard.

Figure 2:
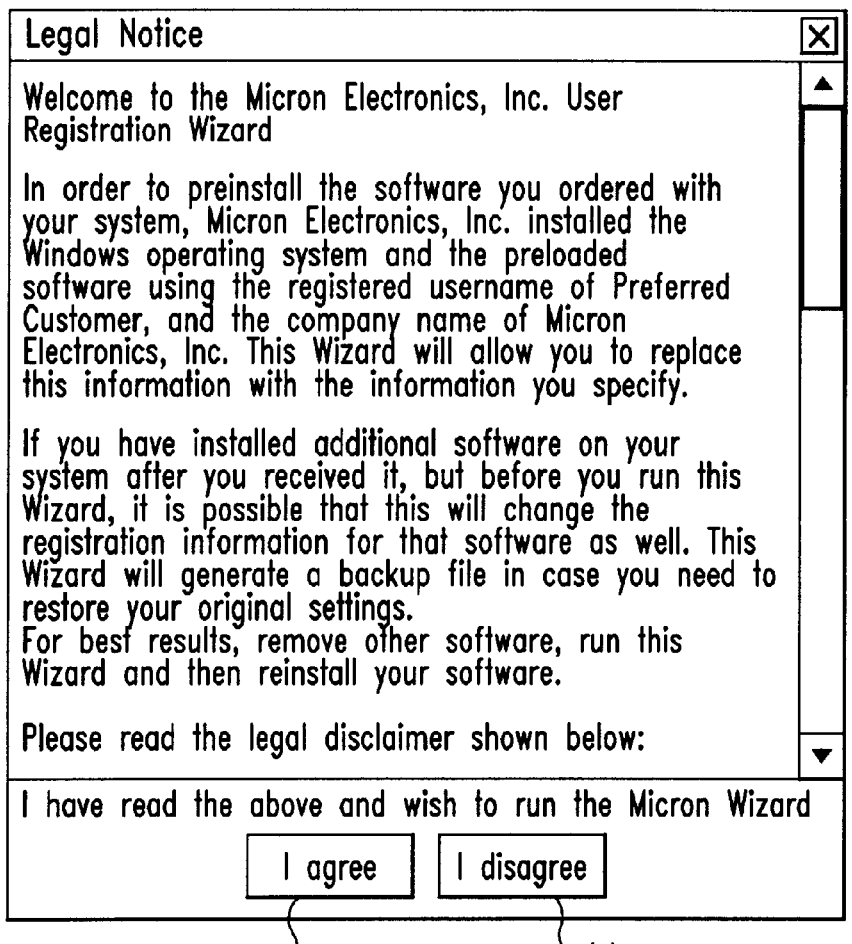
FIG. 2 is an exemplary display screen displaying an introduction and a legal disclaimer.
Figure 3:
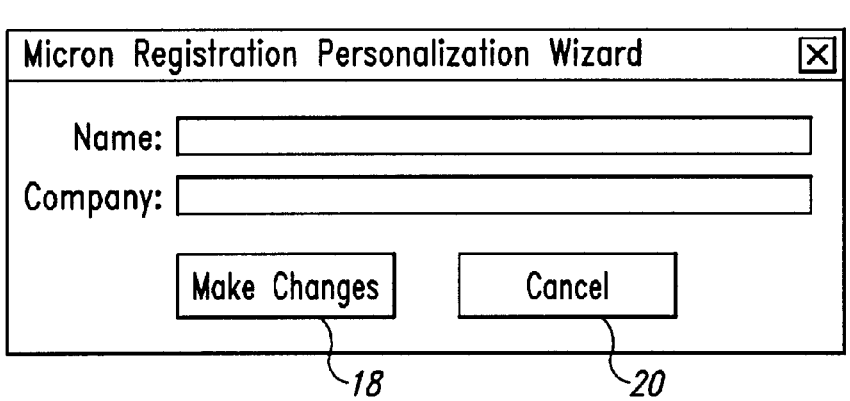
FIG. 3 is an exemplary display screen prompting a user to input name and company information.

FIGS. 2–5 illustrate example screens displayed during execution of the end user registration wizard program by a CPU for customizing pre-loaded software. FIG. 2 illustrates a legal notice screen 10 displayed as an initial screen. The legal notice screen 10 includes an introduction to the user registration wizard and a legal disclaimer. In order to move beyond the legal notice screen 10, the user must click on an "I agree" button 12 or an "I disagree" button 14. If the user disagrees, execution of the program terminates. If the user agrees, the CPU executing this program displays a user input screen 16, illustrated in FIG. 3, which prompts the user to input user-specific registration information. As illustrated, the user is prompted to enter the user's name and a company name. It will be understood that the registration information can include any information that would be useful for a user to have associated with a program. For example, the registration information can include company name, address, telephone number and/or facsimile number.

After inputting the desired user-specific registration information, the user clicks on the "make changes" button 18 or the "cancel" button 20. If the user clicks the cancel button 20, execution of the program terminates. If the user clicks on the "make changes" button 18, the CPU executing the program replaces the input screen 16 with a confirmation screen 24, illustrated in FIG. 4. The confirmation screen 24 displays the pre-existing registration information and the user-specific registration information and indicates that the pre-existing registration information will be replaced by the user-specific registration information and asks the user if the user wishes to continue. The user can click on a "yes" button 26 to make the changes or the "no" button 28 to cancel the changes in which case execution of the program terminates. If the user clicks on the yes button 26, the CPU executing the program displays a final screen 32, illustrated in FIG. 5, that informs the user that the changes are being made.

Figure 1:
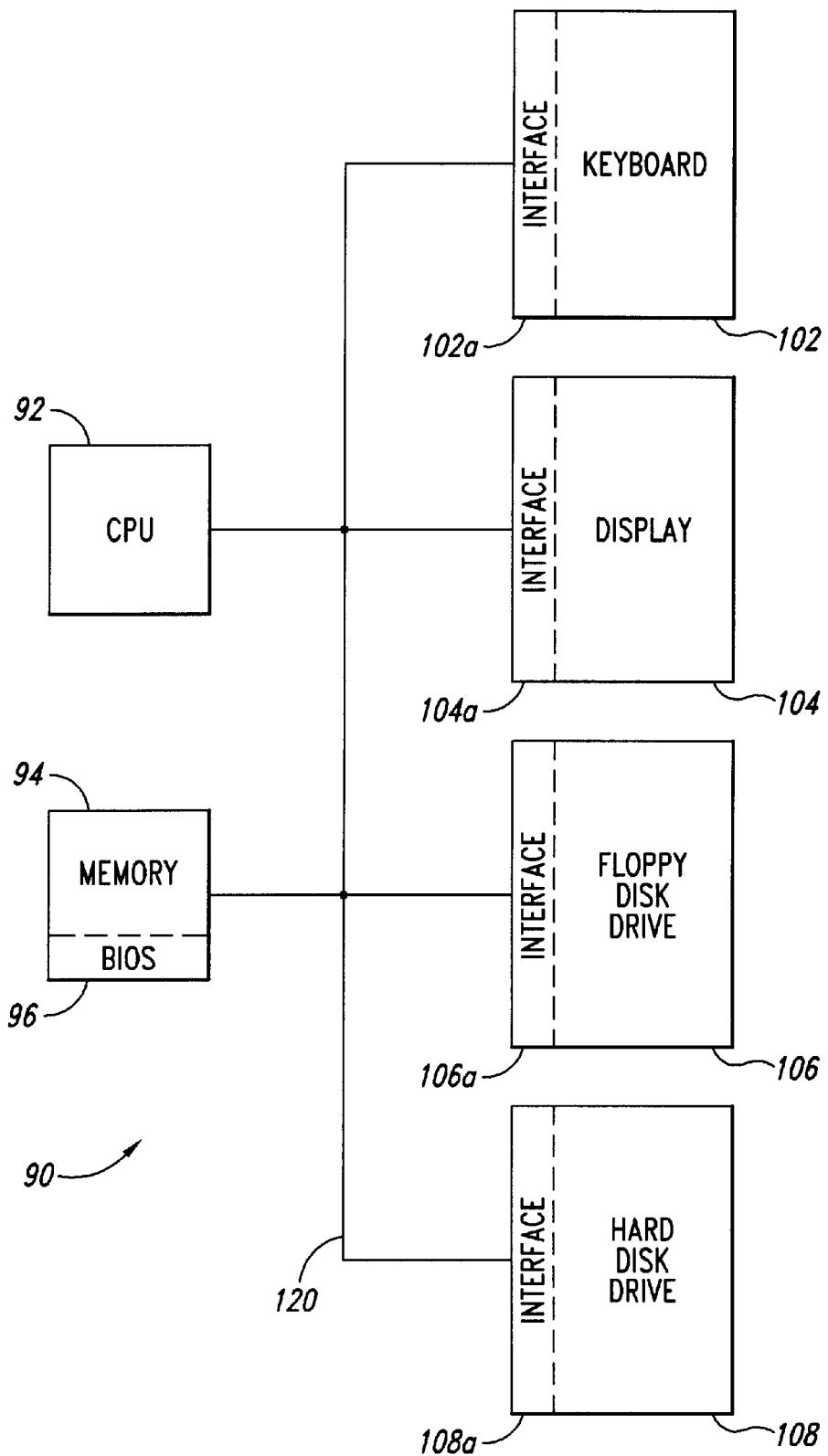
FIG. 1 is a simplified functional block diagram of a conventional computer system with which the invention may be used.

FIG. 1 illustrates a simplified functional block diagram of a conventional computer system 90. The system 90 includes a central processing unit (CPU) 92, such as an Intel Pentium® II microprocessor. The system 90 also includes memory 94, which may include both random access memory (RAM) and read-only memory (ROM). The ROM portion of the memory 94 contains a program which is typically used by the computer system 90 when power is first applied to the computer system 90 or the system 90 is reset. The ROM portion of the memory 94 includes a basic input/output system (BIOS) 96, which contains a set of instructions that initialize the CPU 92 and other components in the system 90.

The computer system 90 also includes a keyboard 102, keyboard interface 102a, display 104, display interface 104a, floppy disk drive 106, floppy disk drive interface 106a, hard disk drive 108, and hard disk drive interface 108a. It should be appreciated that some of the devices within the computer system 10 can share a common interface board. For example, the floppy disk drive 106 and the hard disk drive 108 are often controlled by a single interface.

The components in the computer system 90 are coupled together by a bus system 120, which may carry power and control signals in addition to data. The bus system 120 may consist of a single bus or several busses interconnected by a bus bridge. For brevity and convenience purposes only, however, the bus system 120 is illustrated in FIG. 1 as a single bus. In addition, and also for brevity and convenience purposes, conventional components such as the power supply and mouse, for example, are not shown in FIG. 1.

In one embodiment of the invention, the end user registration wizard resides on the hard disk drive 108 and can be accessed automatically the first time the operating system runs after purchasing the system 90. Alternatively, the end user registration wizard can be accessed by the user at any time by following a prescribed sequence of actions. For example, if the user "right clicks" on the desktop in Windows 98®, a pop-up menu appears that provides the user with several options, one of which is "Start". If the user "left clicks" on "Start", a sub-list of options appears. The end user registration wizard can be added to the sub-list as one of the options so that the user need only click on that option to run the end user registration wizard. Another alternative is to put the end user registration wizard on a floppy disk, allowing the user to load the program at any time in a manner well known in the art. It is also possible to upload or download the registration wizard over communications path to a recipient computer system 90 where it is stored and then executed by CPU 92.

Figure 4:
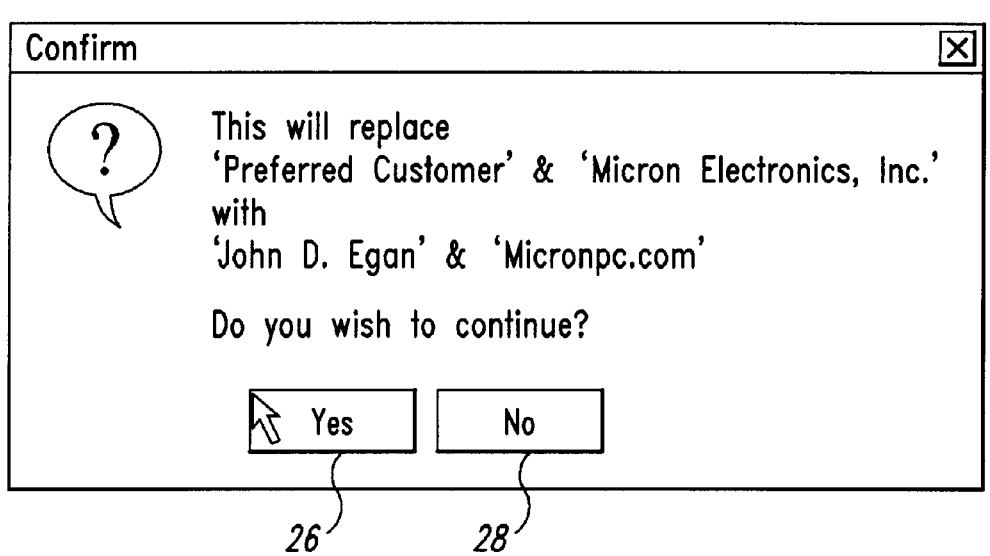
FIG. 4 is an exemplary display screen prompting the user to verify the user information.
Figure 5:
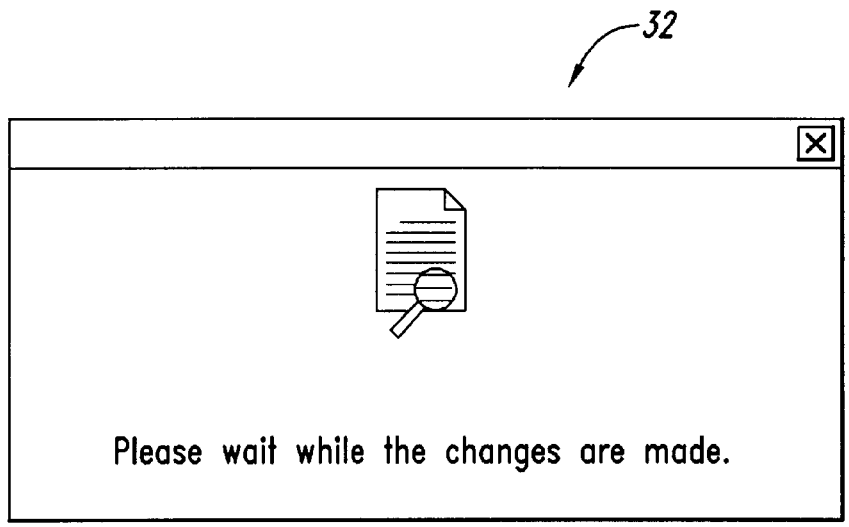
FIG. 5 is an exemplary display screen advising the user to wait while the changes are being made to the registry file.
Figure 6:
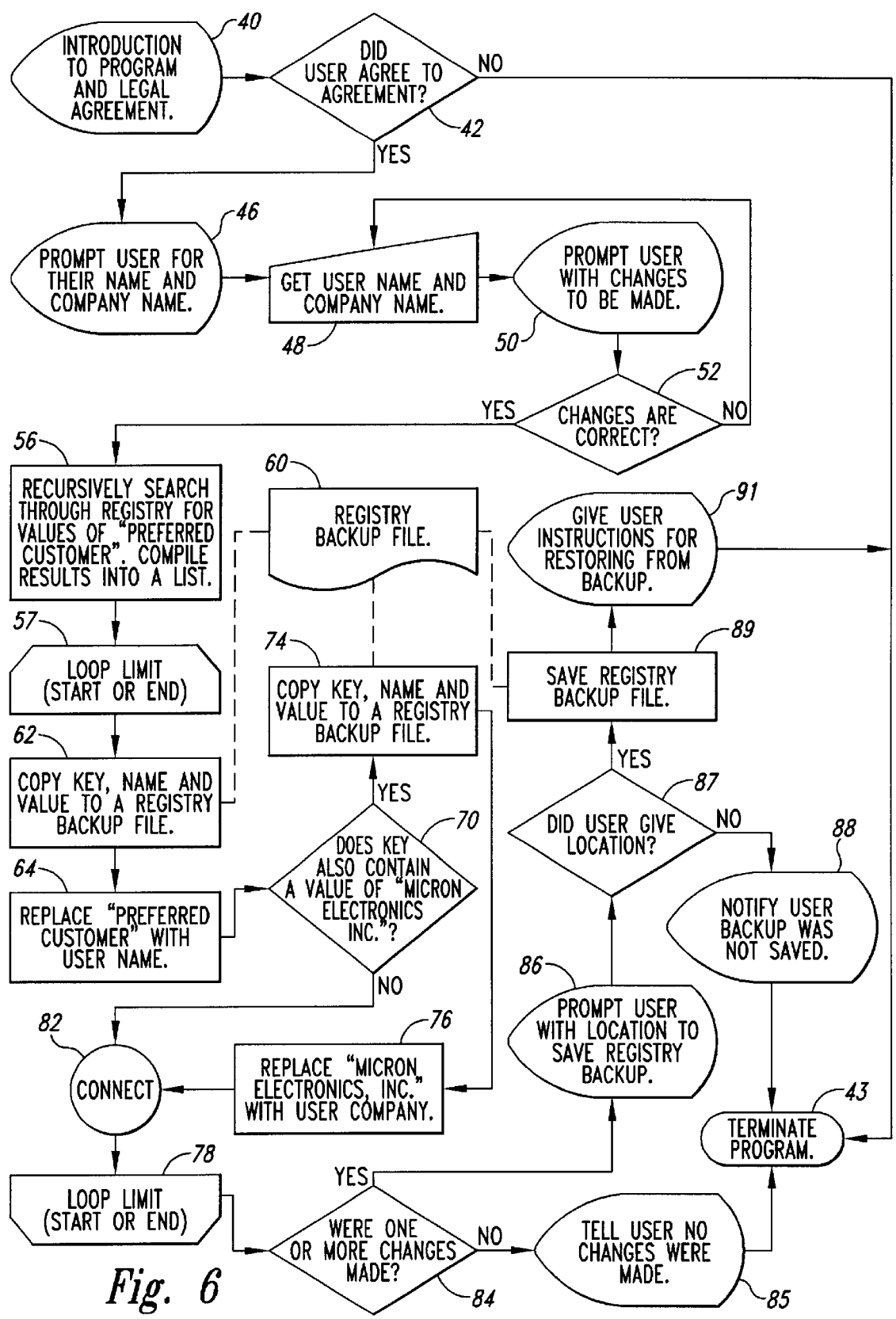
FIG. 6 is a flow diagram of a method of the invention carried out by the FIG. 1 computer system.

FIG. 6 is a flow diagram of an exemplary program for customizing registration information associated with pre-loaded software. Various program segments of FIG. 6, representing acts undertaken by CPU 92 programmed as in FIG. 6, are labeled to facilitate subsequent discussion. At segment 40, CPU 92 displays the legal notice screen 10 of FIG. 2. If the user disagrees with the information displayed in the legal notice screen 10 at segment 42 (by clicking the "I disagree" button 14 of FIG. 2) execution of the program terminates at segment 43. If the user agrees by clicking the "I agree" button 12 of FIG. 2 at segment 42, the system 90 displays the user input screen 16 of FIG. 3 at segment 46, prompting the user to supply his/her name and company name. The user information is received, at segment 48, and the confirmation screen 24 of FIG. 4 is displayed at segment 50. If the user indicates that the changes are incorrect at segment 52 by clicking the "No" button 28 of FIG. 4, the CPU loops back to the user input screen 16 and prompts the user for his/her name and company name at segment 48.

Each item of pre-loaded information is associated with a "key", "name" and "value". As is well known in the art, the key defines the location of the name that contains the value (e.g. "Preferred User").

If, at step 52, the user indicates that the changes are correct, the CPU 92 executes a recursive search of the registry of the operating system for occurrences of a pre-existing value such as "Preferred Customer" at segment 56. The value "Preferred Customer" is the value that is supplied by the manufacturers in response to a "user name" prompt when installing software. A list of the locations of all occurrences of the pre-existing value is formed. A loop comprising segments between segments 57 and 78 is then executed for each location on the list. At each location on the list, the CPU 92, at segment 62, writes the value and its associated key and name to a registry backup file 60. The CPU 92 then replaces the pre-existing value ("Preferred Customer") with the user supplied name, as illustrated at segment 64. At segment 70, the CPU 92 checks the same key to determine if there is another "name", such as "Company Name" that has a pre-existing value entered by the manufacturer. For example, if the computer was manufactured by Micron Electronics, the "value" associated with "Company Name" could be "Micron Electronics, Inc.". If the value is the same as the pre-existing value entered by the manufacturer, the value and the key and name associated with it are appended to the registry backup file, as illustrated at segment 70, and the CPU 92 replaces the pre-existing value with the user supplied value for "Company Name", as illustrated at segment 76. When no more occurrences of "Preferred Customer" are found on the list, the CPU 92 exits the loop at segment 78, the CPU 92 then executes segment 84 and determines whether one or more changes were made. If no changes were made, the CPU 92 displays a message advising the user that no changes were made, as illustrated at segment 85, and terminates the program. If changes were made, the CPU 92 prompts the user, at segment 86, with a suggested storage location for the registry backup file 60. As is known in the art, the user can accept the suggested storage location, provide a preferred location, or decline to use a storage location. If the user accepts the suggested location or supplies a preferred location, as determined at segment 87, the CPU 92 executes segment 89 and saves the registry backup file 60 at the location provided and displays a message, as illustrated at segment 91, providing the user with instructions for restoring the registration information from the backup. If the user declines, the CPU 92, at segment 88, notifies the user that the backup was not saved and terminates the program.

The present invention provides a method for customizing pre-loaded software by automatically replacing pre-existing registration information with user supplied registration information. Modifications can be made to the invention and equivalents substituted for described and illustrated structures and method acts without departing from the spirit or scope of the invention. Accordingly, the scope of the present invention is not to be considered as limited by the specifics of the particular structure and method acts which have been described and illustrated, but is only limited by the scope of the appended claims.

What is claimed is:

1. A computer implemented method by which a user customizes registration information predefined by a third party and associated with pre-loaded software, the method comprising the acts of:

prompting a user to supply new user registration information;

searching at least one stored file containing the third-party predefined registration information; and replacing the third party registration information with the new user supplied user registration information in said file and storing said file containing said new user supplied user registration information.

2. The method of claim 1 further comprising the act of saving the file containing the third party-predefined user registration information to a backup file.

3. The method of claim 2 wherein the act of saving includes the act of prompting the user for a storage location and storing the third party-predefined user registration information at a location provided by the user as said backup file.

4. The method of claim 3 further comprising the act of providing the user with instructions for restoring the backup file.

5. The method of claim 3 further comprising the act of informing the user that the backup file has not been saved when the user fails to provide a storage location.

6. The method of claim 1 wherein the new user registration information includes at least the name of the user, which name differs from any name in the third party-predefined registration information.

7. The method of claim 1 wherein the new user registration information includes at least a company name.

8. The method of claim 1 further comprising the act of prompting the user to confirm user supplied new user registration information.

9. The method of claim 1 wherein the act of searching at least one file includes the act of conducting a recursive search for files containing the third party-predefined registration information.

10. The method of claim 9 wherein the act of searching at least one file includes the act of saving the third party-predefined registration information to a backup file.

11. The method of claim 1 further including the acts of displaying an introduction and prompting the user to agree or disagree with the contents thereof.

12. The method of claim 11 further including the act of terminating the method in the event that the user disagrees with the content.

13. The method of claim 11 further including the acts of presenting a user input screen for receiving the new user registration information and prompting the user to indicate a desire to make indicated changes.

14. The method of claim 1 wherein the act of searching at least one file includes forming a list of locations where the third party-predefined registration information occurs and using said list to replace the third party-predefined registration information with the new user registration information at each occurrence in the list.

15. The method of claim 1 further comprising the act of determining whether any changes were made in the act of replacing said information and, if no changes were made, advising the user that no changes were made.

16. The method of claim 15 wherein, if such changes were made, the method further comprises prompting the user for a storage location and storing the third party-predefined registration information at a location provided by the user as a backup file.

17. The method of claim 15 wherein the method is automatically initiated the first time the user uses the computer.

18. A computer readable storage medium containing a computer readable code for operating a computer to perform a method of changing a computer registry file, the computer registry file including registration information predefined by a third party, the method comprising the acts of:

prompting a user to supply new user registration information;

receiving new user registration information from the user;

searching for a registry file which contains the predefined registration information; and replacing the predefined registration information in said registry file with said new user supplied user registration information.

19. The computer readable storage medium of claim 18 wherein the method further comprises the act of saving the third party-predefined registration information to a registry backup file.

20. The computer readable storage medium of claim 19 wherein the act of saving includes the act of prompting the user for a storage location and storing the new user registration information at a location provided by the user.

21. The computer readable storage medium of claim 20 wherein the act of saving includes the act of providing the user with instructions for restoring the backup file.

22. The computer readable storage medium of claim 20 wherein the act of saving includes the act of informing the user that the backup file has not been saved in the event that the user fails to provide a storage location.

23. The computer readable storage medium of claim 18 wherein the act of receiving new user registration information includes the act of prompting the user to verify the received new user registration information.

24. The computer readable storage medium of claim 18 wherein the act of searching the registry file includes the act of conducting a recursive search of the registry file containing the third party-predefined registration information.

25. The computer readable storage medium of claim 24 wherein the act of searching the registry file includes the act of saving the third party-predefined registration information to a backup file.

26. The computer readable storage medium of claim 25 wherein the method further includes the act of terminating the method in the event that the user disagrees.

27. The computer readable storage medium of claim 25 wherein the method further includes the acts of presenting a user input screen for receiving the new user registration information and prompting the user to indicate a desire to make indicated changes or to cancel the making of changes.

28. The computer readable storage medium of claim 18 wherein the method further includes the acts of displaying an introduction and prompting the user to agree or disagree.

29. The computer readable storage medium of claim 18 wherein the act of searching at least one file includes forming a list of locations where the third party-predefined registration information occurs and using said list to replace the third party-predefined registration information with the new user registration information at each occurrence in the list.

30. The computer readable storage medium of claim 14 wherein the storage medium is accessed automatically to initiate the method the first time the user uses the computer.

31. A system for automatically replacing pre-existing registration information predefined by a third party with user supplied registration information in a registry file of a computer operating system, the system comprising:

a memory circuit;

a computer readable storage medium containing program instructions for execution by a processor which causes the processor to replace the pre-existing registration information with the new user supplied registration information in a stored registry file; and a processor connected to the memory circuit and the computer readable storage medium, the processor executing the program instructions stored on the computer readable medium to:

prompt a user for new user registration information;

search for a registry file which contains existing registration information; and replace the pre-existing registration information in said registry file with the new user registration information.

32. A system for automatically replacing registration information predefined by a third party with user supplied registration information in a registry file of a computer operating system, the system comprising:

a memory circuit;

a computer readable storage medium containing the third party-predefined registration information and program instructions for execution by a processor which causes the processor to replace the third party-predefined registration information with the new user supplied registration information in a stored registry file; and a processor connected to the memory circuit and the computer readable storage medium, the processor automatically executing the program instructions stored on the computer readable medium the first time the user uses the computer operating system to:

prompt a user for new user registration information;

search for a registry file which contains the third party-predefined registration information; and replace the third party-predefined registration information in said registry file with the new user registration information.

33. The system of claim 32 wherein the act of searching for a registry file includes forming a list of locations where the third party-predefined registration information occurs and using said list to replace the third party-predefined registration information with the new user registration information at each occurrence in the list.

* * * * *

UNITED STATES PATENT AND TRADEMARK OFFICE
CERTIFICATE OF CORRECTION

PATENT NO.    : 6,327,707 B1
DATED         : December 4, 2001
INVENTOR(S)   : McKeeth et al.

It is certified that error appears in the above-identified patent and that said Letters Patent is hereby corrected as shown below:

Column 5,
Line 5, "third-party" should be -- third party- --;

Column 6,
Line 60, "14" should be -- 18 --;

Signed and Sealed this

Twenty-fourth Day of September, 2002

*Attest:*

JAMES E. ROGAN
*Attesting Officer*     *Director of the United States Patent and Trademark Office*